United States Patent
Gundavelli et al.

(10) Patent No.: US 11,564,081 B1
(45) Date of Patent: Jan. 24, 2023

(54) AUTO-UPDATE AND ACTIVATION OF LOCALE-SPECIFIC ESIM PROFILE FOR A GLOBAL ENTERPRISE USER

(71) Applicant: Cisco Technology, Inc., San Jose, CA (US)

(72) Inventors: Srinath Gundavelli, San Jose, CA (US); Indermeet Singh Gandhi, San Jose, CA (US); Arun G. Khanna, Sunnyvale, CA (US); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 21 days.

(21) Appl. No.: 17/368,091

(22) Filed: Jul. 6, 2021

(51) Int. Cl.
H04W 8/20 (2009.01)
H04W 60/00 (2009.01)
H04W 8/26 (2009.01)
H04W 84/04 (2009.01)

(52) U.S. Cl.
CPC .......... *H04W 8/205* (2013.01); *H04W 8/265* (2013.01); *H04W 60/00* (2013.01); *H04W 84/045* (2013.01)

(58) Field of Classification Search
CPC ..... H04W 8/205; H04W 8/265; H04W 60/00; H04W 84/045
USPC .......... 455/435.1, 410, 558, 432.1, 436, 442
See application file for complete search history.

(56) References Cited

U.S. PATENT DOCUMENTS

| 9,137,656 B2 | 9/2015 | O'Leary |
| 10,178,242 B2 | 1/2019 | Guday et al. |
| 10,200,837 B1 | 2/2019 | Steck |
| 10,440,558 B1 | 10/2019 | De Figueiredo Junior et al. |
| 2004/0132449 A1* | 7/2004 | Kowarsch ............... H04W 4/24 455/433 |
| 2005/0088999 A1 | 4/2005 | Waylett et al. |

(Continued)

OTHER PUBLICATIONS

Siemens, Volkswagen, "KI#1, Solution to support SNPN access using 3rd party credentials via external Credential Provider—Note on Potential Key Hierarchy Impact", SA WG2 Meeting #140E e-meeting, Aug. 19-Sep. 1, 2020, 4 pages.

(Continued)

*Primary Examiner* — Nghi H Ly (74) *Attorney, Agent, or Firm* — Edell, Shapiro & Finnan, LLC (57) ABSTRACT

A method is performed at a server that manages embedded subscriber identity module (eSIM) profiles. The method includes, when a user equipment that belongs to a global enterprise network relocates from a first locale to a second locale in which a first private network and a second private network of the global enterprise network are located, wherein the user equipment includes a locale-specific first eSIM profile that includes a first non-public network identifier of the first private network, receiving, from the user equipment over a network in the second locale, information that indicates the user equipment is in the second locale. The method further includes identifying the second private network based on the information, and generating a locale-specific second eSIM profile that includes a second non-public network identifier for the second private network. The method includes configuring the user equipment with the locale-specific second eSIM profile.

20 Claims, 8 Drawing Sheets

(56) References Cited

U.S. PATENT DOCUMENTS

| | | | | |
|---|---|---|---|---|
| 2006/0291483 | A1* | 12/2006 | Sela | H04M 1/0262 370/401 |
| 2008/0125117 | A1* | 5/2008 | Jiang | H04W 8/12 455/433 |
| 2008/0280605 | A1* | 11/2008 | Ophir | H04W 8/065 455/433 |
| 2017/0149795 | A1 | 5/2017 | Day, II | |
| 2018/0160294 | A1 | 6/2018 | Lee et al. | |
| 2018/0206123 | A1 | 7/2018 | Guday et al. | |
| 2019/0028881 | A1 | 1/2019 | Namiranian | |
| 2019/0075453 | A1 | 3/2019 | Yoon et al. | |
| 2019/0140837 | A1 | 5/2019 | Cheng et al. | |
| 2019/0141605 | A1 | 5/2019 | Watson et al. | |
| 2019/0230510 | A1 | 7/2019 | Ben Henda et al. | |
| 2020/0045541 | A1 | 2/2020 | Kreishan | |
| 2020/0050439 | A1 | 2/2020 | Bjørdal et al. | |
| 2020/0052907 | A1 | 2/2020 | Park et al. | |
| 2020/0092711 | A1 | 3/2020 | Chen et al. | |
| 2020/0288300 | A1 | 9/2020 | Oswal et al. | |
| 2021/0051478 | A1 | 2/2021 | Avula et al. | |
| 2021/0084467 | A1 | 3/2021 | Roy et al. | |
| 2021/0084485 | A1 | 3/2021 | Roy et al. | |

OTHER PUBLICATIONS

Jerichow, Anja et al., "3GPP Non-Public Network Security," Journal of ICT, vol. 8_1, 57-76. River Publishers, doi: 10.13052/jicts2245-800X.815, Jan. 4, 2020, 20 pages.

J. Arkko et al., "Extensible Authentication Protocol Method for 3rd Generation Authentication and Key Agreement (EAP-AKA)," Network Working Group, Request for Comments: 4187, Category: Informational, Jan. 2006, 79 pages.

B. Aboba et al., "Extensible Authentication Protocol (EAP)," Network Working Group, Request for Comments: 3748, Obsoletes: 2284, Category: Standards Track, Jun. 2004, 67 pages.

GSM Association, "eSIM Whitepaper," The what and how of Remote SIM Provisioning, Mar. 2018, 21 pages.

GSM Association, "RSP Technical Specification," Version 2.2.1, Official Document SGP.22—RSP Technical Specification, Dec. 2018, 250 pages.

P. Yee, "Updates to Internet X.509 Public key Infrastructure Certificate and Cerlincate Revocation List (CRL) Profile," Internet Engineering Task Force (IETF), Request for Comments: 6818, Updates: 5280, Category: Standards Track, ISSN: 2070-1721, Jan. 2013, 8 pages.

J. Arkko et al., "Improved Extensible Authentication Protocol Method for 3rd Generation Authentication and Key Agreement (EAP-AKA')", Network Working Group, Request for Comments: 5448, Updates: 4187, Category: Informational, May 2009, 29 pages.

P. Funk, "Extensible Authentication Protocol Tunneled Transport Layer Security Authenticated Protocol Version 0 (EAP-1 I LSvO)", Network Working Group, Request for Comments: 5281, Category: Informational, Aug. 2008, 51 pages.

D. Cooper et al., "Internet X.509 Public Key Infrastructure Certificate and Certificate Revocation List (CRL) Profile", etwork Working Group, Request for Comments: 5280, Obsoletes: 3280, 4325, 4630, Category: Standards Track, May 2008, 151 pages.

B. Aboba et al., "Extensible Authentication Protocol (EAP) Key Management Framework", Network Working Group, Request for Comments: 5247, Updates: 3748, Category: Standards Track, Aug. 2008, 79 pages.

D. Simon et al., "The EAP-TLS Authentication Protocol", Network Working Group, Request for Comments: 5216, Obsoletes: 2716, Category: Standards Track, Mar. 2008, 34 pages.

GSM Association, "RSP Architecture" Version 2.2, Official Document SGP.21, Sep. 1, 2017, 95 pages.

Android Open Source Project, "Implementing eSIM," https://source.android.com/devices/tech/connect/esim-overview#euicc-manager, downloaded Jul. 10, 2020, 14 pages.

Apple Inc., "Mobile Device Management Protocol Reference," Mar. 25, 2019, 227 pages.

Apple Inc., "Update the eSIM Cellular Plan", https://developer.apple.com/documentation/devicemanagement/update_the_esim_cellular_plan, downloaded Jul. 9, 2020, 2 pages.

* cited by examiner

AUTO-UPDATE AND ACTIVATION OF LOCALE-SPECIFIC ESIM PROFILE FOR A GLOBAL ENTERPRISE USER

TECHNICAL FIELD

The present disclosure relates to managing location-specific embedded subscriber identity module (eSIM) profiles across networks.

BACKGROUND

User equipment (UE) (i.e., mobile device) support for roaming is a challenge for global enterprises managing private $3^{rd}$ Generation Partnership Project (3GPP)/fifth generation (5G) networks. Such private networks are also referred to as "standalone non-public networks" (SNPNs) and, more generally, as "non-public networks" (NPNs). Frequency spectrum regulators in different regulatory domains are opening-up spectrum for private use. The spectrum sharing rules are locale-specific, and impose strict rules on how network identifiers (NIDs) for the NPNs are to be allocated and shared across different enterprises. For example, in the 3.5 GHz citizens broadband radio service (CBRS) band, there is a common public land mobile network (PLMN) identifier (ID) (e.g., 0310 015) and a unique NID that are allocated for each of the CBRS network operators. Together, the PLMN and NID set/pair identify an NPN, i.e., a private network. The same allocation is not expected to be used in another country, which is under a different regulatory domain. Therefore, a global enterprise network with private network branches in different countries may potentially end up with unique sets of network identifier allocation, e.g., PLMN ID and NID, on a per-location basis. Each unique set of network identifiers is thus "locale-specific."

A global enterprise customer having private network branches in different countries/regulatory domains has to manage all of the allocated network identifiers from all of the countries/regions to ensure that each UE belonging to the global enterprise has an embedded subscriber identity module (eSIM) profile with credentials for accessing the network branches, including the locale-specific network identifiers. Meaning, for example, a UE in San Jose needs to have the eSIM profile with the PLMN ID and NID allocation specific to the San Jose region, and allocations of network identifiers of all of the other regions. However, it is impractical to provision all of the network identifiers of the global enterprise (which may number in the hundreds, in some cases) into the eSIM profile of the UE. The consequence of having only a fixed local network identifier for a local private network in the eSIM profile of the UE is that the UE does not have support for roaming to another private network. Thus, an enterprise user visiting a branch in another region will not be able to connect to the private network of that region.

DESCRIPTION OF EXAMPLE EMBODIMENTS

Overview

A method is performed at a server configured to manage embedded subscriber identity module (eSIM) profiles. The method includes, when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over a network in the second locale, information that indicates the user equipment is in the second locale. The method further includes identifying the second private network based on the information, and generating a locale-specific second eSIM profile that includes a second non-public network identifier for the second private network. The method also includes configuring the user equipment with the locale-specific second eSIM profile.

Example Embodiments

Figure 1:
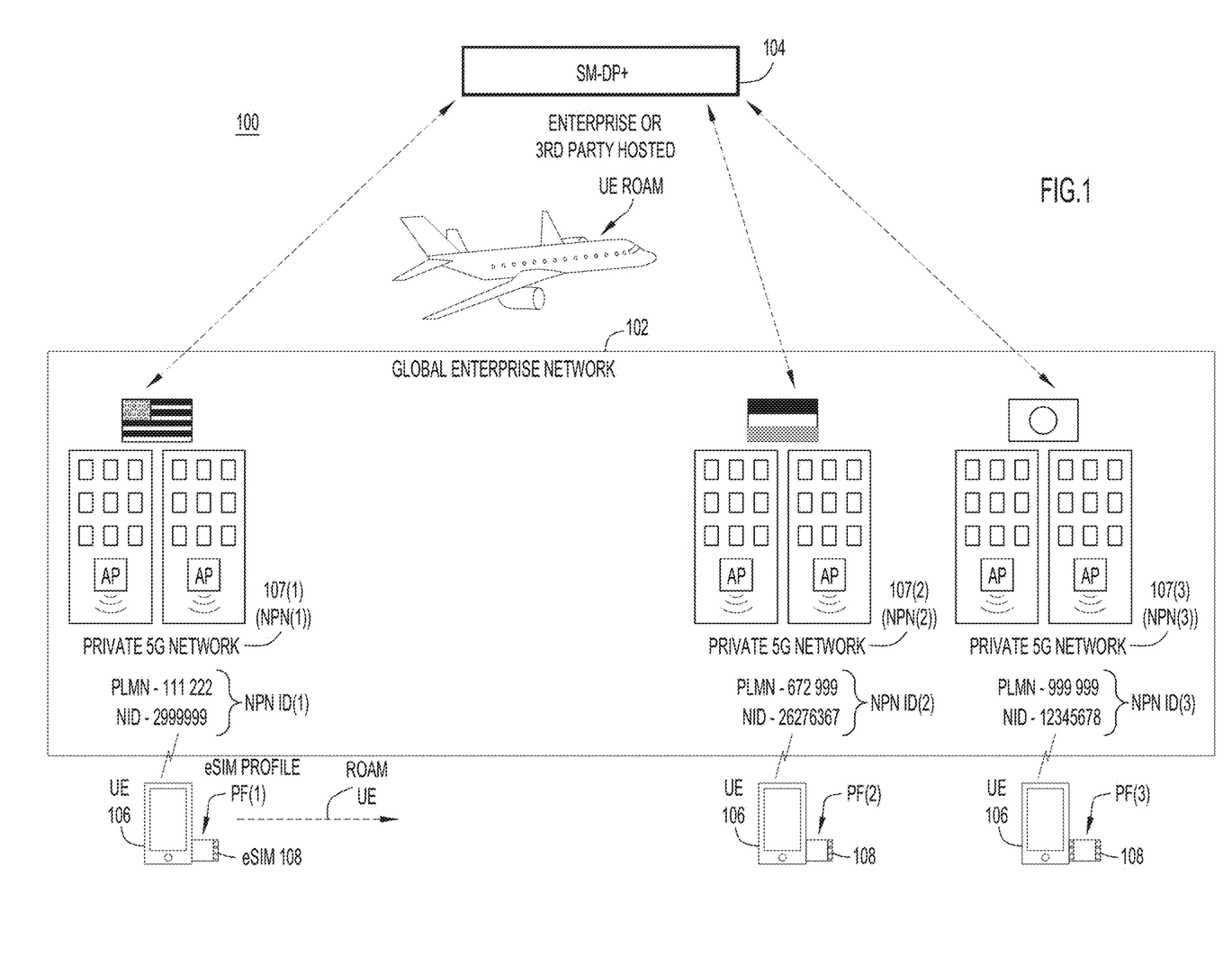
FIG. 1 is an illustration of a network environment in which embodiments directed to automatically updating a locale-specific embedded subscriber identity module (eSIM) profile in user equipment (UE) when the UE relocates to a new region may be implemented, according to an example embodiment.

FIG. 1 is an illustration of an example network environment 100 in which embodiments directed to automatically updating a private, locale-specific eSIM profile in user equipment (UE) when the UE relocates to a new country/region may be implemented. The embodiments solve the above-mentioned problems and offer other advantages presented herein. Network environment 100 includes a global enterprise network 102 for an enterprise or company, a subscription manager data preparation (SM-DP+) server 104 (also referred to simply as "SM-DP+ 104"), and UE or mobile device 106. The network environment shown in FIG. 1 includes one SM-DP+ and one UE by way of example, only. In practice, the network environment may include many SM-DP+ servers and UEs.

Global enterprise network 102 may be a private network that includes constituent private networks (also referred to as "private network branches" or "private branches") 107(1)-107(3) (equivalently referred to as "non-public networks" (NPNs) NPN(1)-NPN(3), respectively) in different regulatory domains for different regions, including the United States, Germany, and Japan, respectively. NPNs NPN(1)-NPN(3) may each employ wireless access points (APs) to connect with UE 106. As used herein, the term "access point" generally refers to a network element that provides the UE with wireless access to a network for any known or hereafter developed access technology, including, but not limited to, WiFi®, cellular, and the like. For example, the access point may serve as a WiFi access point, a gNodeB (gNB), and so on. In the example of FIG. 1, global enterprise network 102 and NPNs NPN(1)-NPN(3) may all be private 5G networks, although other types of networks are possible. Also, while only three NPNs are shown, there may be many more NPNs in practice.

An NPN may be identified by an NPN ID that includes a unique combination of PLMN ID and NID, denoted (PLMN ID, NID). Thus, global enterprise network 102 is assigned different NPN IDs (PLMN ID, NID) for each of the regions. For example, private networks NPN(1), NPN(2), and NPN (3) are respectively assigned NPN IDs NPN ID(1)=(111 222, 2999999), NPN ID(2)=(672 999, 26276367), and NPN ID=(999 999, 12345678).

In the example of FIG. 1, UE 106 is associated with/operated by a user authorized to access global enterprise network 102 through each of private networks NPN(1)-NPN (3). UE 106 includes an embedded Universal Integrated Circuit Card (eUICC)/eSIM 108 (more generally referred to as an "eSIM" 108) configured to store one or more eSIM profiles. When roaming between each of private networks NPN(1)-NPN(3) (i.e., when relocating from one geographical region to the next in which the private network branches are located), UE 106 should have locale-specific eSIM profiles PF(1)-PF(3) configured for each of the private networks to enable the UE to connect to each of the private networks to access global enterprise network 102. To this end, locale-specific eSIM profiles PF(1)-PF(3) include NPN IDs NPN ID(1)-NPN ID(3), respectively.

In the example of FIG. 1, locale-specific eSIM profiles PF(1)-PF(3) are local-specific private (network) eSIM profiles that enable UE 106 to access locale-specific NPNs NPN(1)-NPN(3) of global enterprise network 102 to which UE 106/the user of the UE belongs (i.e., the UE/user are members of the global enterprise network). As used herein, the term "locale" means a geographical region. The geographical region may be a country, generally, or more specifically, a region of the country. Thus, a locale-specific private network of a global enterprise network is located in a specific region.

SM-DP+ 104 may include a cloud-based entity operated by the enterprise or a third party. Generally, SM-DP+ 104 includes a server that hosts applications configured to manage eSIM profiles for UEs, and provision/configure the UEs with the eSIM profiles, with respect to networks the UEs are authorized to access. In the example of FIG. 1, SM-DP+ 104 creates/generates locale-specific eSIM profiles PF(1)-PF3 for UE 106 as the UE relocates from one geographical region to the next, in which NPNs NPN(1)-NPN(3) are located.

In accordance with embodiments presented herein, at a high-level, when UE 106 relocates to a new locale (e.g., relocates from the United States to Germany), the UE acquires its location (e.g., a GPS location of the UE), acquires local network information specific to the new locale, accesses its current locale-specific eSIM NPN ID (e.g., NPN ID(1) from locale-specific eSIM profile PF(1) for the United States), accesses unique UE identifiers, and sends the aforementioned information to SM-DP+ 104. Based on the information, SM-DP+ 104 creates a new locale-specific SIM profile for the UE (e.g., locale-specific eSIM profile PF(2) for Germany). The new locale-specific eSIM includes a new NPN ID (i.e., PLMN and NID) that will allow the UE to communicate with, e.g., discover and attach to, a new locale-specific private network of global enterprise network 102. SM-DP+ 104 pushes the new locale-specific eSIM profile to UE 106, and the UE installs the new locale-specific eSIM profile in its eSIM. The process repeats each time UE 106 relocates to a new locale. In addition, existing eSIM profiles that were previously installed in UE 106 in the previous locale may be removed or deactivated in the new locale.

Figure 2:
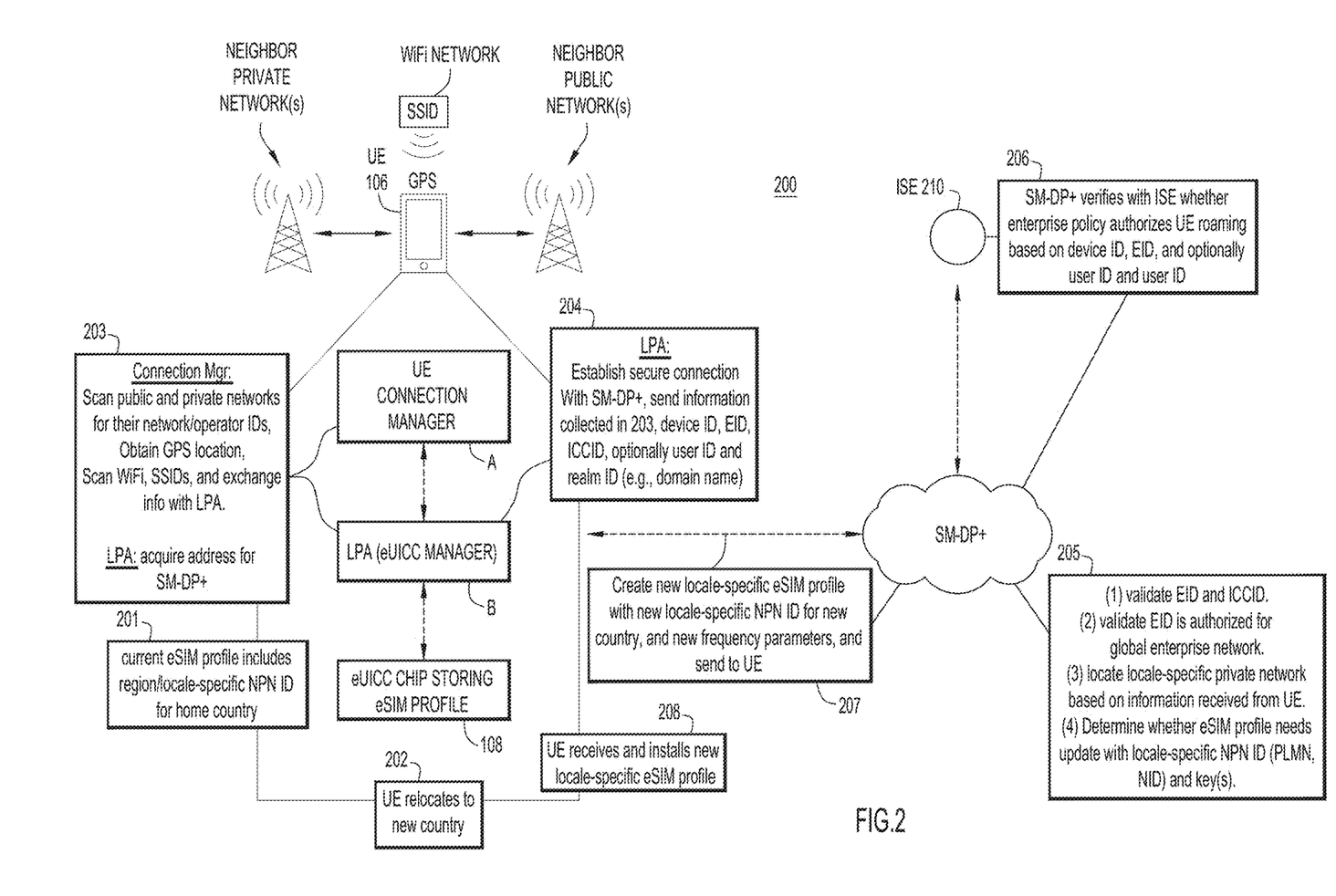
FIG. 2 shows operations performed in the network environment to update a locale-specific eSIM profile in the UE when the UE relocates, according to an example embodiment.

With reference to FIG. 2, there is an illustration of example operations 200 performed in network environment 100 to update a locale-specific eSIM profile in UE 106 when the UE relocates from one locale to another. In the example of FIG. 2, UE 106 may include a UE connection manager A, a local profile assistant (LPA) B, and eSIM 108 connected to, and configured to communicate, with each other. UE connection manager A manages/controls wireless network connections for UE 106. LPA B includes a set of functions responsible for providing the capability to download encrypted eSIM profiles to eSIM 108. Additionally, UE 106 is GPS-enabled, i.e., includes a GPS receiver to acquire a GPS location of the UE. When UE 106 is WiFi enabled and thus capable of supporting WiFi access, detection of WiFi networks may provide additional parameters indicative of a location of the UE.

Generally, UE 106 is also provisioned with one or more unique UE/mobile device identifiers, such as a device ID, an eUICC ID (EID), embedded identity document (also referred to as an "EID"), and an integrated circuit card (ICC) ID (ICCID). Other types of unique UE identifiers are possible. UE 106 may also be provisioned with a user identity for the user of the UE, e.g., a user name, or the like. UE 106 may also be provisioned with a domain name or realm for global enterprise network 102, e.g., "[enterprise_name].com."

At 201, while UE 106 is located in a home country/locale, the UE is provisioned with a locale-specific eSIM profile that includes an NPN ID for an NPN located in the home locale. For example, the NPN ID may be obtained during UE onboarding in the home locale. The locale-specific eSIM profile additionally includes a location reconfiguration element (LRE) associated with updating the locale-specific eSIM profile, according to embodiments presented herein. The LRE may include a bit that, when set, causes UE 106 to (i) monitor its GPS location to detect when the UE relocates from a current locale to a new locale, and (ii) when such a relocation is detected, trigger an eSIM update procedure to update the UE with a new locale-specific eSIM profile for the new locale, i.e., to reflect the new locale, and to remover or deactivate the previous locale-specific eSIM profile for the home locale.

At 202, UE 106 moves or relocates from the home locale to a new country/locale. UE 106 does not have private network credentials for the new locale, and cannot connect to/access any network, e.g., cellular networks, in the new locale. Because the LRE bit is set, UE 106 monitors its GPS location, detects its location change and, in response, triggers the eSIM update procedure, including next operations 203-208.

At 203, UE 106 collects locale-specific information from the environment indicative of the new locale (i.e., that indicates the UE is located in the second locale), and that may be used to establish (i) initial network connections in the new locale, and (ii) a connection to SM-DP+ 104. Specifically, connection manager A:

a. Scans the radio frequency (RF) environment for "neighbor" public networks in the new locale, and records identifiers associated with any neighbor public networks acquired/discovered by the scan. Such identifiers may include public mobile network operator (MNO) PLMN IDs and gNodeB (gNB) IDs, for example. A "neighbor" network is a network within the detection range of, and thus discoverable by, UE 106.

b. Scans the RF environment for neighbor private networks, and records identifiers associated with any neighbor private networks acquired/discovered by the scan. Such identifiers may include private MNO PLMN IDs and gNB IDs, for example.

c. Obtains GPS location coordinates of UE 106.

d. Scans wireless network IDs, e.g., WiFi service set (SS) IDs (SSIDs).

Collectively, the above information represents "neighbor network parameters" (e.g., identifiers associated with private and public networks within range/in the vicinity of UE 106) along with the GPS location. Connection manager A exchanges the neighbor network parameters for the neighbor networks and the GPS location with LPA B. LPA B uses a predetermined/existing SM-DP+ address, or uses its fully qualified domain name (FQDN), to initiate a new connection to SM-DP+ 104. The connection to SM-DP+ 104 may be over a WiFi or other wireless network, for example.

At 204, LPA B transitions to a secure connection to SM-DP+ 104. LPA B sends to SM-DP+ 104, over the secure connection, information that includes (i) the neighbor network parameters (e.g., public MNO PLMNs IDs, gNB IDs, neighbor private network PLMN IDs and NIDs, and SSIDs) and GPS location collected at 203, (ii) one or more of the unique UE identifiers, (iii) the NPN ID for the home private network, and (iv) optionally the domain name and the user identity.

At 205, SM-DP+ 104 receives the information sent by UE 106 at 204, and performs the following operations:

a. Validate the one or more unique UE identifiers sent by UE 106 against a list of valid UE identifiers stored at or accessible to the SM-DP+. In this example, the validation is successful.

b. Validate that the EID has a profile enabled for access to a global enterprise private network (e.g., for access to global enterprise network 102).

c. Locate/identify a new locale-specific private network (that is part of the global enterprise private network) that UE 106 should be able to access in the new locale. For example, SM-DP+ 104 identifies which of private networks NPN(1)-NPN(3) are located/operating in the new locale. To do this, SM-DP+ 104 uses one or more of the neighbor network parameters and the GPS location, for example.

d. Determine whether the current locale-specific eSIM profile of UE 106 should be updated to include a new NPN ID (i.e., PLMN ID and NID), for the new locale-specific private network identified at (c), and whether new authorization keys should be generated. At a high-level, this operation represents a determination as to whether to generate, for UE 106, a new locale-specific eSIM profile that would enable the UE to access the new locale-specific private network.

At 206, SM-DP+ 104 exchanges information with an enterprise policy server or function 210 (also referred to as an "identity service engine 210") to perform further validation/authorization with respect to UE 106. In an example, ISE 210 may be an authentication, authorization, and accounting (AAA) server configured to perform the operations described herein. ISE 210 is configured with enterprise policy rules for global enterprise network 102. The enterprise policy rules define which UEs and users are authorized to access which private networks (e.g., NPN(1)-NPN(3)) of the global enterprise network (e.g., global enterprise network 102), i.e., which of the UEs are allowed to roam to which of the private networks of the global enterprise network.

To do this, SM-DP+ 104 sends to ISE 210 an authorization request to authorize UE 106 for the new locale-specific private network. The request includes the NPN ID of the new locale-specific private network, and one or more of the unique UE IDs, such as the EID. The authorization request may also include one or more of the domain name and the user ID. Upon receiving the authorization request, ISE 210 determines whether UE 106 is authorized to access the new locale-specific private network based on a comparison of the information provided in the authorization request against the rules of the enterprise policy. When the comparison indicates that UE 106 is authorized, ISE 210 sends to SM-DP+ 104 an authorization response indicating an authorization "success." When the comparison indicates that UE 106 is not authorized, ISE 210 sends to SM-DP+ 104 an authorization response indicating an authorization "fail."

Assuming authorization success, at 207, SM-DP+ 104 generates a new locale-specific eSIM profile for UE 106. The new locale-specific eSIM profile is configured to enable UE 106 to access the new locale-specific private network. Thus, the new locale-specific eSIM profile includes the NPN ID for the new locale-specific private network, and may also include specific frequencies or a specific frequency band used to access the new locale-specific private network. SM-DP+ 104 configures UE 106 with the new locale-specific eSIM profile. This includes sending the new locale-specific eSIM profile to UE 106. When UE 106 receives the new locale-specific eSIM profile, the UE loads the new locale-specific eSIM profile into its eSIM, and activates the new profile. In addition, one or more previous eSIM profiles for previous locales may be deleted or deactivated.

At 208, UE 106 accesses/connects to the new locale-specific private network using the NPN ID in the new locale-specific eSIM and the specific frequencies.

Figure 3:
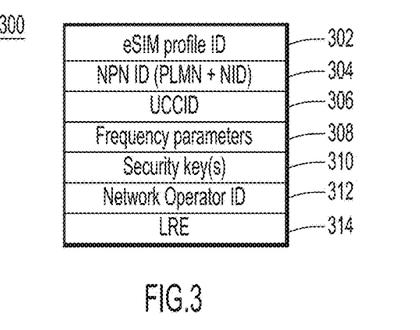
FIG. 3 is an illustration of an eSIM profile, according to an example embodiment.
Figure 4:
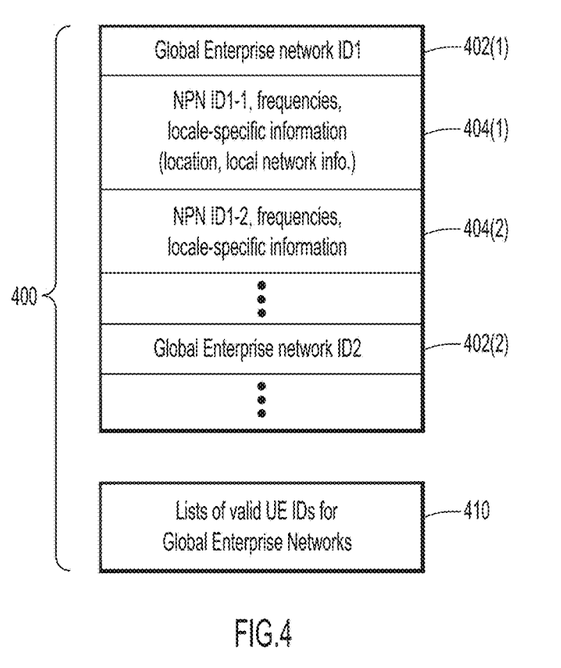
FIG. 4 is an illustration of a database stored at a subscription manager data preparation (SM-DP+) server of the network environment, according to an example embodiment.
Figure 5:
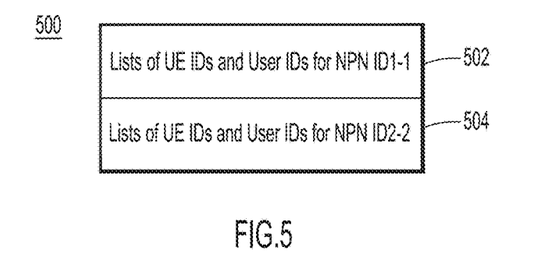
FIG. 5 is an illustration of a database/policy rule set used by an enterprise policy server of the network environment to authorize UE access to private networks, according to an example embodiment.

Various databases used in the embodiments presented herein are shown in FIGS. 3-5.

With reference to FIG. 3, there is an illustration of an example eSIM profile 300 stored in UE 106. The eSIM profile 300 includes, but is not limited to, an eSIM profile ID 302 to distinguish the eSIM profile from other eSIM profiles, an NPN ID 304 for a particular private network, an ICCID 306, frequency parameters 308, security keys 310, a network operator ID 312, and an LRE 314. Frequency parameters 308 may include a set of individual frequencies and/or a specific frequency band used to access the particular private network.

With reference to FIG. 4, there is an illustration of an example database 400 stored in or accessible to SM-DP+ 104. Database 400 includes entries 402(1), 402(2), and so on, for corresponding global enterprise networks. Each entry 402(1), 402(2), etc., identifies a corresponding global enterprise network, and includes further entries 404(1), 404(2), and so on, that list corresponding locale-specific private networks that belong to that global enterprise network. Each entry 404(1), 404(2), etc., identifies a corresponding locale-specific private network, and includes an NPN ID for the locale-specific private network, frequencies used to access that network, and locale-specific information that may be used to identify that network. The locale-specific information may include network information (e.g., identifiers for various public and private networks operating in the locale of the locale-specific private network, and WiFi SSIDs), and location coordinates for the region in which the locale-specific network operates. Database 400 also includes lists (identified generally at 410) of valid UE IDs for each of the global enterprise networks identified by each entry 402(1), 402(2), etc.

With reference to FIG. 5, there is an illustration of an example database/policy rule set 500 stored in or accessible to ISE 210. Policy rule set 500 includes a list 502 of UE IDs authorized for each NPN ID and a list 504 of user IDs authorized for each NPN ID.

Figure 6A:
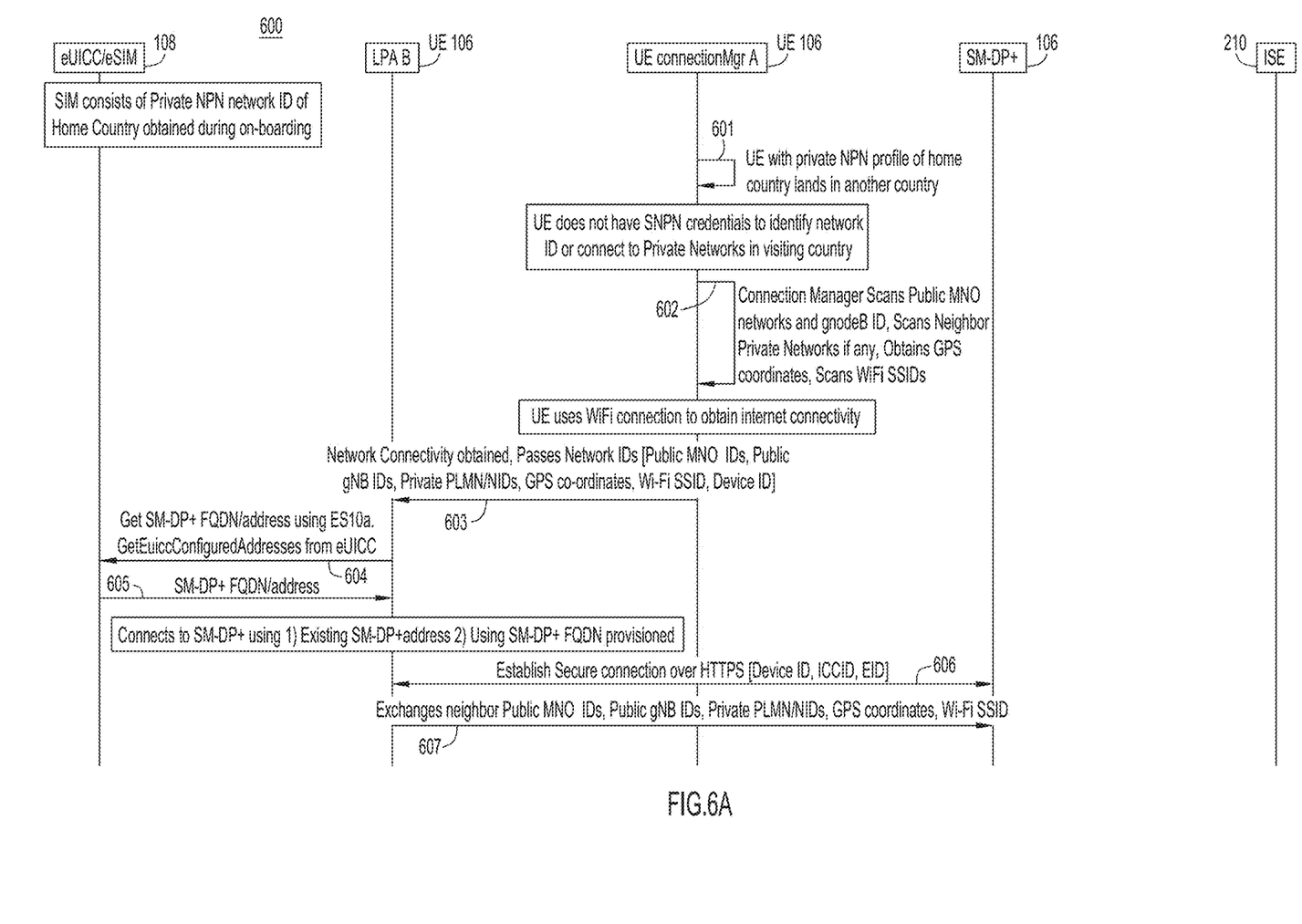
FIGS. 6A and 6B show a transaction diagram of transactions implemented in the network environment to update a locale-specific eSIM profile in a UE when the UE relocates, according to an example embodiment.
Figure 6B:
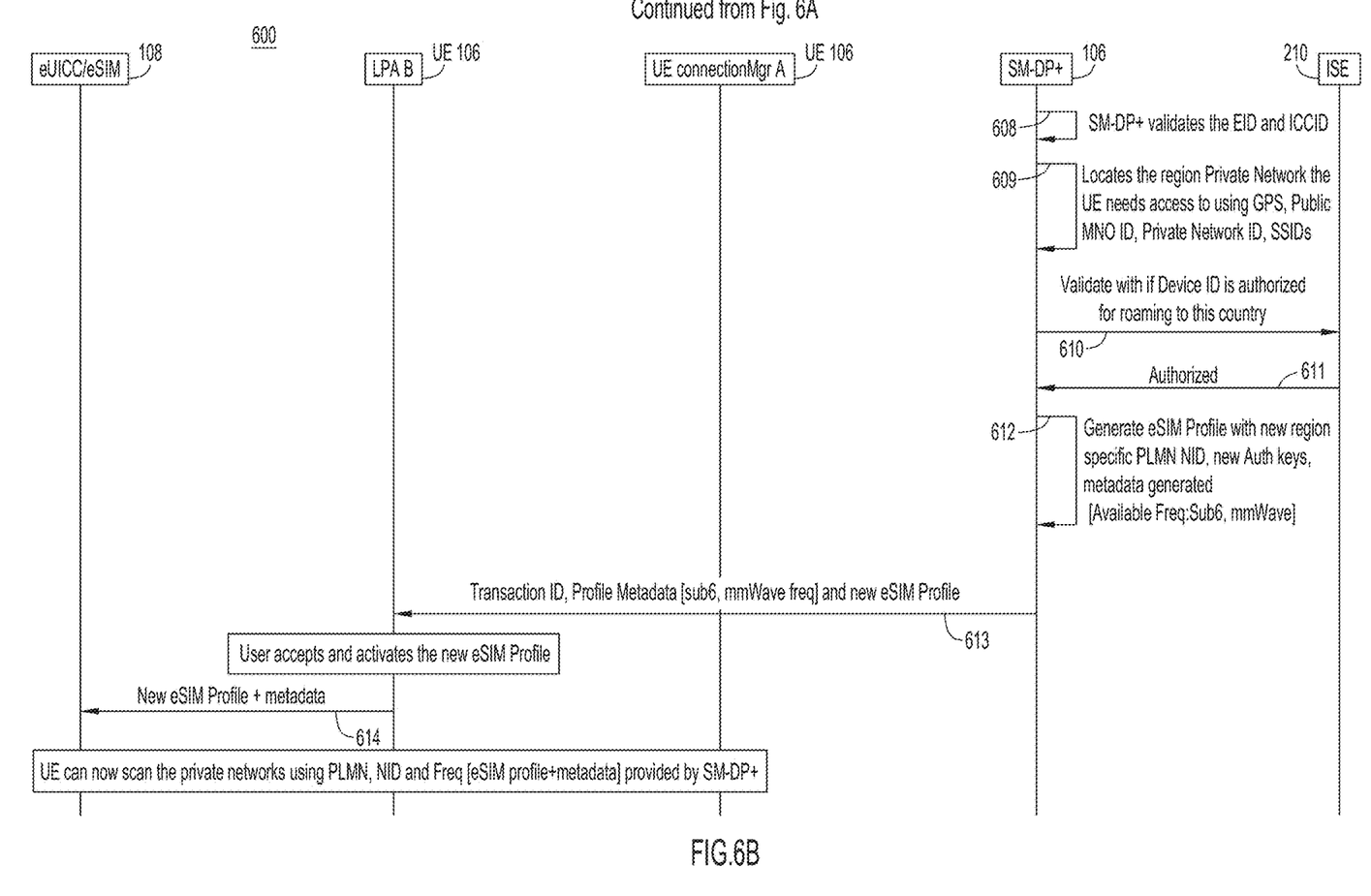

With reference to FIGS. 6A and 6B, there is a transaction diagram of example transactions 600 implemented in network environment 100 to update a locale-specific eSIM profile in UE 106 when the UE relocates from one locale to another. Transactions and operations shown in FIGS. 6A and 6B include operations described above. Reference is first made to FIG. 6A. It is assumed that, initially, eSIM 108 of UE 106 is provisioned with the NPN ID (including PMSN and NID) of a locale-specific private network in a home locale during onboarding of the UE. At 601, UE 106 relocates from the home locale to a new locale, e.g., another country. UE 106 does not have NPN credentials to connect to a new locale-specific private network in the new locale. UE 106 detects the location change and triggers an eSIM update procedure comprising operations described below.

At 602, connection manager A of UE 106 collects information including (i) neighbor network parameters based on a scan of the local wireless network environment, and (ii) its GPS location. Connection manager A uses any available networks, such as WiFi networks, to obtain Internet connectivity, for example. At 603, connection manager A passes the collected information to LPA B. At 604, LAP B requests an SM-DP+ address from eSIM 108. At 605, eSIM 108 returns an SM-DP+ address to LPA B. Using the address, at 606, LPA B establishes a secure network connection to SM-DP+ 104, and provides one or more unique UE IDs (e.g., device ID, ICCID, and/or ED) to the SM-DP+ over the secure network connection. At 607, LPA B provides to SM-DP+ 104 over the secure network connection the information (e.g., neighbor network parameters and GPS location) collected at 602, and also the NPN ID of the private network in the home locale. SM-DP+ 104 receives the information sent by UE 106 to the SM-DP+ at 606 and 607.

Turning to FIG. 6B, at 608, SM-DP+ 104 validates the one or more unique UE IDs (e.g., EID and ICCID). At 609, SM-DP+ 104 identifies or locates a new locale-specific private network (of global enterprise network 102) to which the UE should have access, based on the neighbor network parameters, the GPS location sent by UE 106, and optionally the NPN ID of the private network for the home locale (this NPN ID may be used simply as an index to identify the global enterprise network, for example). For example, SM-DP+ 104 compares the neighbor network parameter and the GPS location to corresponding information in locale-specific private network entries 404(2), 402(2), etc., of database 400 in search of a matching one of the locale-specific private networks.

At 610 and 611, SM-DP+ 104 interacts with ISE 210 to determine whether UE 106 is authorized to roam to the new locale, meaning whether the UE is authorized to connect to the new locale-specific private network identified at 609. To do this, SM-DP+ 104 sends to ISE 210 an authorization request that includes the NPN ID of the new locale-specific private network and one or more unique UE IDs. ISE 210 determines whether UE 106 is authorized based on a comparison of the one or more unique UE IDs and NPN ID against the enterprise policy rules accessible to the ISE, e.g., in database/policy rule set 500. Upon determining that UE 106 is authorized, ISE 210 sends to SM-DP+ 104 an authorization response that indicates authorization success. Otherwise, ISE 210 sends to SM-DP+ 104 an authorization response that indicates authorization fail. Success is assumed in this example.

Upon receiving the authorization success, at 612, SM-DP+ 104 creates/generates a new locale-specific eSIM profile for the new locale-specific private network. SM-DP+ 104 populates the new locale-specific eSIM profile, in part, with the following information for the new locale-specific private network: NPN ID; specific frequencies and/or frequency band (e.g., millimeter wave, sub-6 GHz, and so on) used to access the new locale-specific private network; and authorization key(s). Alternatively, the aforementioned information may be partitioned between the new locale-specific eSIM profile and metadata associated with the new profile, but not actually included in the new profile.

At 613, SM-DP+ 104 sends to LPA B of UE 106 a message that includes the new locale-specific eSIM profile (and any associated metadata). The message may include a transaction ID. At 614, LPA B of UE 106 accepts and activates the new locale-specific eSIM profile (and any associated metadata). At 614, LPA B loads the new locale-specific eSIM profile (and any associated metadata) into eSIM 108. This provides UE 106 with the capability to scan and connect to the new local-specific network based on the information in the new locale-specific eSIM profile (and any associated metadata).

Figure 7A:
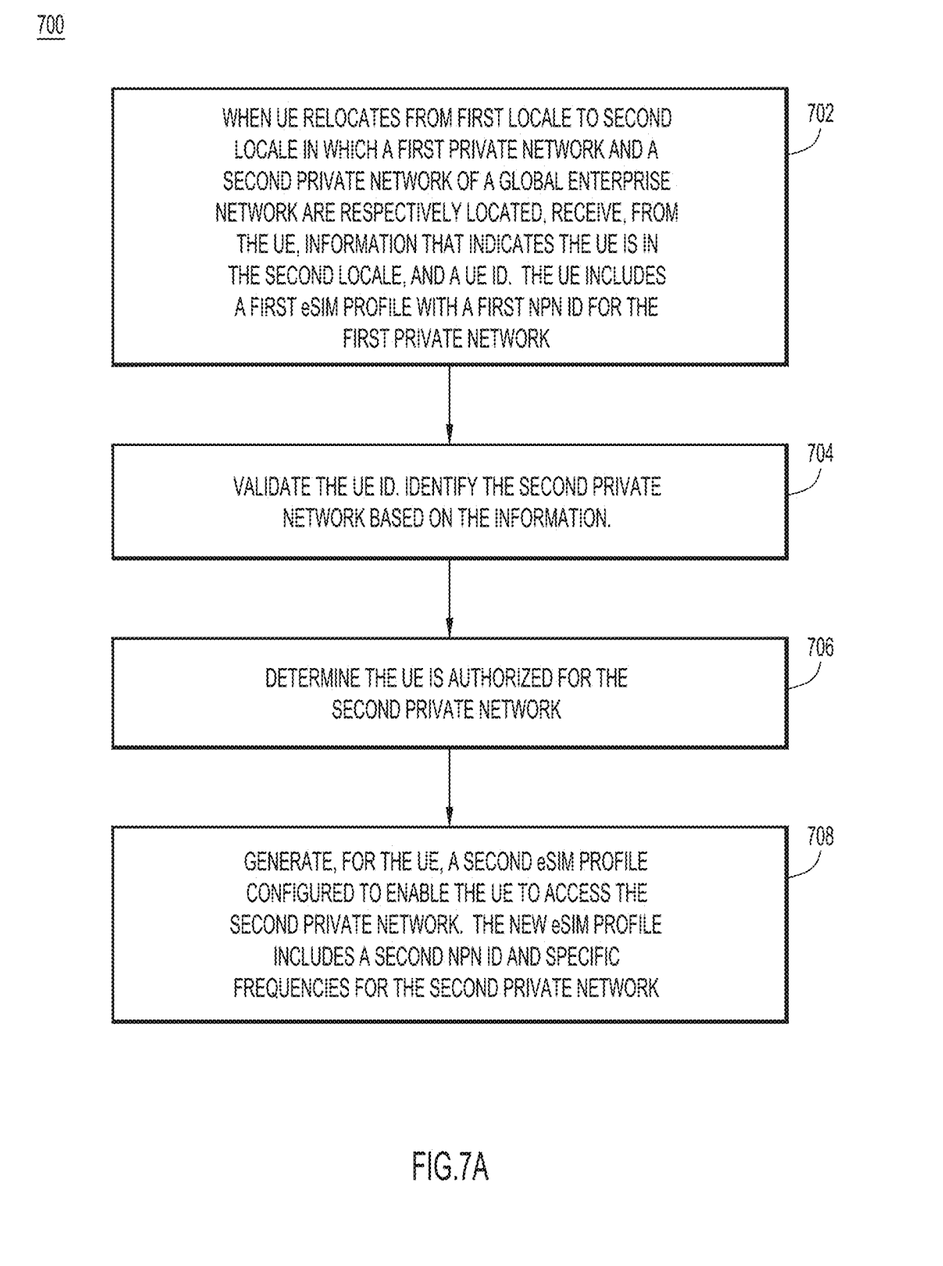
FIG. 7A is a flowchart of a method of updating a locale-specific eSIM profile in a UE when the UE relocates, performed by the SM-DP+ server, according to an example embodiment.

FIG. 7A is a flowchart of an example method 700 of updating a locale-specific eSIM profile in a UE when the UE relocates, according to an example embodiment. Method 700 may be performed primarily by a server (e.g., SM-DP+ 104) configured to manage eSIM profiles. The UE belongs to/is a member of a global enterprise network that includes geographically distributed locale-specific private networks/private branches. For example, the UE/user may be part of a policy group in which users of the group are allowed to connect to any NPN at any locale. Such users may include sales personnel and executives in an organization.

At 702, the UE relocates from a first or initial locale (i.e., a first region) to a second or new locale (e.g., a second region) in which a first private network (i.e., a first NPN) and a second private network (i.e., a second NPN) of the global enterprise network are located, respectively. The UE includes an eSIM loaded with (i.e., that stores) a locale-specific first eSIM profile including a first NPN ID of the first private network but not the second private network. When the UE relocates from the first locale to the second locale, the UE sends to the server, and the server receives from the UE, over a network in the second locale, information that indicates the UE is in the second locale, and a unique UE ID. The information includes neighbor network identifiers (e.g., identifiers associated with neighbor public and private networks of the UE in the second locale), and a GPS location of the UE.

At 704, the server validates the unique UE ID. The server identifies or locates the second private network based on the received information.

At 706, the server, interacting with an enterprise policy server, determines that the UE is authorized to access the second private network.

At 708, the server generates a locale-specific second eSIM profile configured to enable the UE to access the second private network. The locale-specific second eSIM profile includes a second NPN ID (e.g., PLMN ID and NPN ID) and specific frequencies and/or a specific frequency band used to access the second private network. The locale-specific second eSIM profile may also include a location reconfiguration element set to cause the UE to (i) detect a change in locale of the UE by monitoring a GPS location of the UE, and (ii) upon detecting the change in locale based on the monitoring, trigger an eSIM update procedure to update the eSIM with the locale-specific second eSIM profile.

Figure 7B:
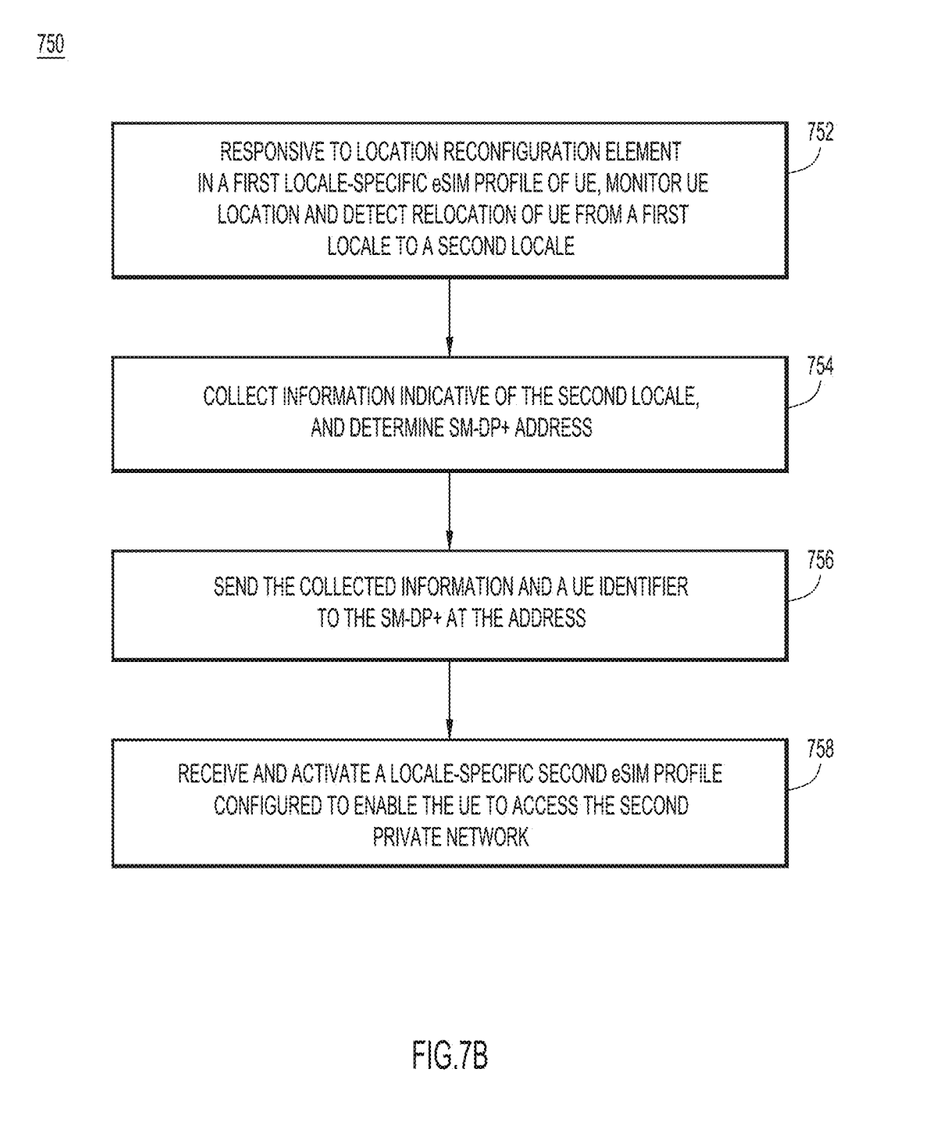
FIG. 7B is a flowchart of a method of updating a locale-specific eSIM profile in a UE when the UE relocates, performed by the UE, according to an example embodiment.

FIG. 7B is a flowchart of an example method 750 of updating a locale-specific eSIM profile in a UE when the UE relocates from a first locale to a second locate in which a first private network and as second private network of a global enterprise network are respectively located. The UE is configured to access a GPS location of the UE from a GPS receiver included in the UE. The UE includes an eSIM loaded with a locale-specific first eSIM profile for the first private network, but not the second private network. The eSIM profile also includes a location reconfiguration element that is set to trigger the UE to perform the operations described below.

At 752, responsive to the location reconfiguration element, the UE monitors its GPS location and detects the change from the first locale to the second locale.

At 754, responsive to detecting the relocation, the UE collects information indicative of the second locale (as described above). The UE also determines a network address for an SM-DP+ server.

At 756, the UE connects to the SM-DP+ server using the address. The UE sends to the SM-DP+ the information and a unique UE ID.

At 758, the UE receives from the SM-DP+ server, and activates, a locale-specific second eSIM profile configured to enable the UE to access the second private network. The UE access the second private network using the locale-specific second eSIM profile.

Figure 8:
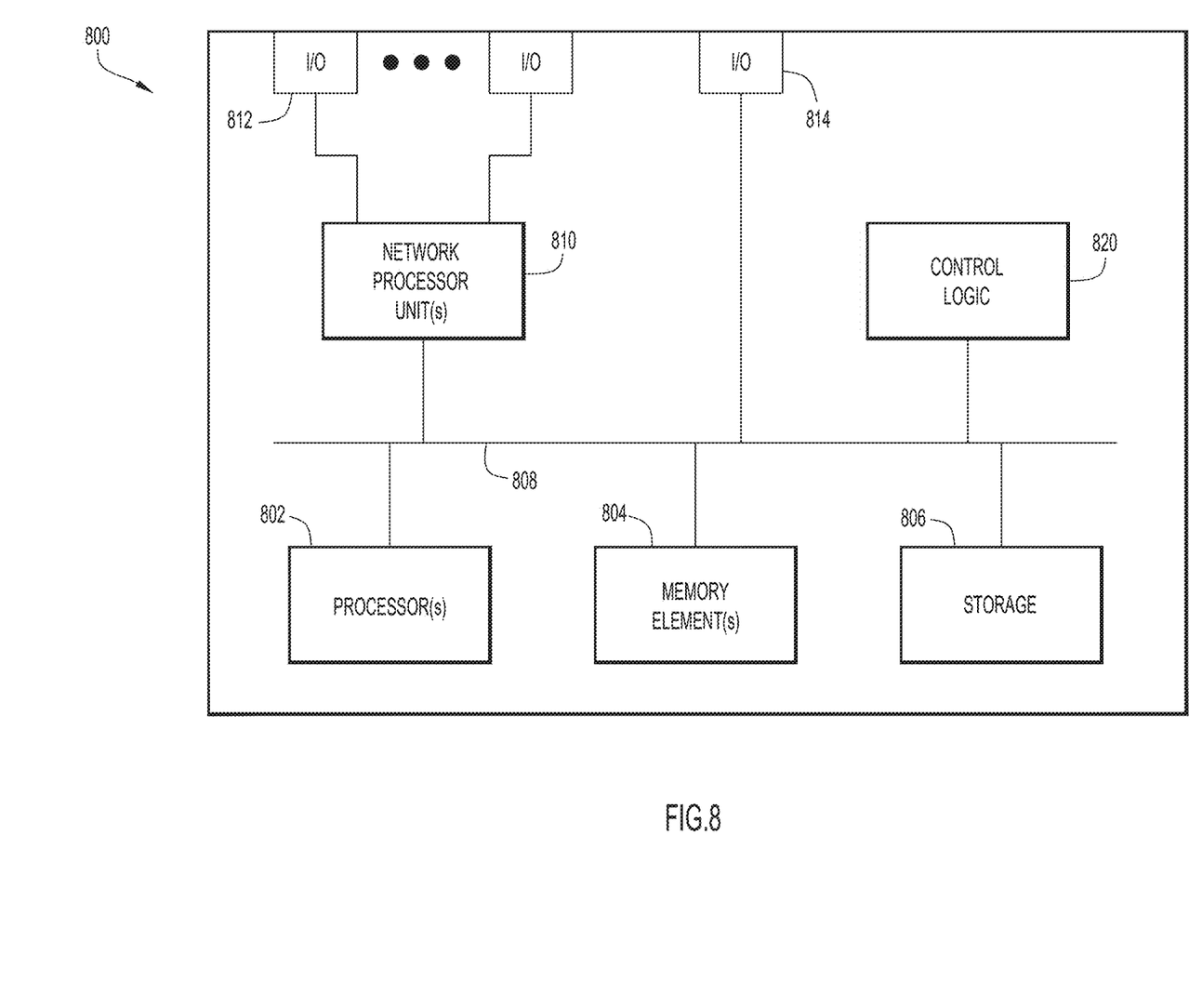
FIG. 8 is a hardware block diagram of a computing device that may perform operations described herein, according to an example embodiment.

Referring to FIG. 8, FIG. 8 illustrates a hardware block diagram of a computing device 800 that may perform functions associated with operations discussed herein in connection with the techniques depicted in FIGS. 1-7B. In various embodiments, a computing device or apparatus, such as computing device 800 or any combination of computing devices 800, may be configured as any entity/entities as discussed for the techniques depicted in connection with FIGS. 1-7B in order to perform operations of the various techniques discussed herein. Computing device 800 may be configured to perform as any of a UE/mobile device, SM-DP+, ISE, and so on, as described herein. When configured as a UE/mobile device, computing device may represent a SmartPhone, tablet, laptop computer, desktop computer, and the like.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: at a server configured to manage embedded subscriber identity module (eSIM) profiles: when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over a network in the second locale, information that indicates the user equipment is in the second locale; identifying the second private network based on the information; generating a locale-specific second eSIM profile that includes a second non-public network identifier for the second private network; and configuring the user equipment with the locale-specific second eSIM profile.

In another form, an apparatus is provided comprising: a network input/output interface to communicate with a network; and a processor of a server configured to manage embedded subscriber identity module (eSIM) profiles, the processor coupled to the network input/output interface and configured to perform: when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over the network in the second locale, information that indicates the user equipment is in the second locale; identifying the second private network based on the information; generating a locale-specific second eSIM profile that includes a second non-public network identifier for the second private network; and configuring the user equipment with the locale-specific second eSIM profile.

In yet another form, a non-transitory computer readable medium is provided. The computer readable medium stores instructions that, when executed by a processor of a server configured to manage embedded subscriber identity module (eSIM) profiles, cause the processor to perform: when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over a network in the second locale, information that indicates the user equipment is in the second locale; identifying the second private network based on the information; generating a locale-specific second eSIM profile that includes a second non-public network identifier for the second private network; and configuring the user equipment with the locale-specific second eSIM profile.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server configured to manage embedded subscriber identity module (eSIM) profiles:
   when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over a network in the second locale, information that indicates the user equipment is in the second locale;
   identifying the second private network based on the information;
   generating a locale-specific second eSIM profile that includes a second non-public network identifier for the second private network; and
   configuring the user equipment with the locale-specific second eSIM profile.

2. The method of claim 1, further comprising, at the server:
   receiving a user equipment identifier from the user equipment; and
   performing identifying, generating, and configuring upon validating the user equipment identifier.

3. The method of claim 1, further comprising, at the server:
   upon determining that the user equipment is authorized to access the second private network, performing generating the locale-specific second eSIM profile.

4. The method of claim 3, further comprising, at the server, receiving a user equipment identifier from the user equipment, wherein determining that the user equipment is authorized to access the second private network includes:
   sending, to an enterprise policy server, a request to authorize the user equipment for the second private network, the request including the user equipment identifier and the second non-public network identifier; and
   receiving, from the enterprise policy server, a response that indicates that the user equipment is authorized to access the second private network.

5. The method of claim 1, wherein:
   the information includes a location of the user equipment and identifiers associated with neighbor networks discovered by the user equipment while in the second locale; and
   identifying includes identifying the second private network using the location and the identifiers associated with the neighbor networks.

6. The method of claim 1, wherein:
   generating the locale-specific second eSIM profile includes generating the locale-specific second eSIM profile to include specific frequencies or a specific frequency band used for access to the second private network.

7. The method of claim 1, wherein the global enterprise network includes a global enterprise 5G network, the first private network and the second private network each include a respective private 5G network, and the first non-public network identifier and the second non-public network identifier are each a respective private 5G network identifier.

8. The method of claim 1, wherein:
   the first non-public network identifier comprises a first public land mobile network (PLMN) identifier and a first network identifier (NID); and
   the second non-public network identifier comprises a second PLMN and a second NID.

9. The method of claim 1, wherein generating includes generating the locale-specific second eSIM profile to include a location reconfiguration element set to cause the user equipment to (i) monitor for a change in locale of the user equipment and, (ii) upon detecting the change in the locale, trigger an update procedure to update the locale-specific second eSIM profile to reflect the change in locale.

10. The method of claim 1, further comprising, at the user equipment:
    upon detecting that the user equipment has relocated:
    collecting the information;
    determining a network address of the server; and
    forwarding the information over the network to the server using the network address;
    receiving and activating the locale-specific second eSIM profile; and
    accessing the second private network based on the second non-public network identifier.

11. An apparatus comprising:
    a network input/output interface to communicate with a network; and
    a processor of a server configured to manage embedded subscriber identity module (eSIM) profiles, the processor coupled to the network input/output interface and configured to perform:
    when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over the network in the second locale, information that indicates the user equipment is in the second locale;

identifying the second private network based on the information;

generating a locale-specific second eSIM profile that includes a second non-public network identifier for the second private network; and configuring the user equipment with the locale-specific second eSIM profile.

12. The apparatus of claim 11, wherein the processor is further configured to perform:

receiving a user equipment identifier from the user equipment; and performing identifying, generating, and configuring upon validating the user equipment identifier.

13. The apparatus of claim 11, wherein the processor is further configured to perform:

upon determining that the user equipment is authorized to access the second private network, performing generating the locale-specific second eSIM profile.

14. The apparatus of claim 13, wherein the processor is further configured to perform receiving a user equipment identifier from the user equipment, wherein the processor is configured to perform determining that the user equipment is authorized to access the second private network by:

sending, to an enterprise policy server, a request to authorize the user equipment for the second private network, the request including the user equipment identifier and the second non-public network identifier; and receiving, from the enterprise policy server, a response that indicates that the user equipment is authorized to access the second private network.

15. The apparatus of claim 11, wherein:

the information includes a location of the user equipment and identifiers associated with neighbor networks discovered by the user equipment while in the second locale; and the processor is configured to perform identifying by identifying the second private network using the location and the identifiers associated with the neighbor networks.

16. The apparatus of claim 11, wherein:

the processor is configured to perform generating the locale-specific second eSIM profile by generating the locale-specific second eSIM profile to include specific frequencies or a specific frequency band used for access to the second private network.

17. The apparatus of claim 11, wherein:

the first non-public network identifier comprises a first public land mobile network (PLMN) identifier and a first network identifier (NID); and the second non-public network identifier comprises a second PLMN and a second NID.

18. A non-transitory computer readable medium encoded with instructions that, when executed by a processor of a server configured to manage embedded subscriber identity module (eSIM) profiles, cause the processor to perform:

when a user equipment that belongs to a global enterprise network relocates from a first locale to a second locale in which a first private network and a second private network of the global enterprise network are respectively located, wherein the user equipment includes a locale-specific first eSIM profile including a first non-public network identifier of the first private network but not the second private network, receiving, from the user equipment over a network in the second locale, information that indicates the user equipment is in the second locale;

identifying the second private network based on the information;

generating a locale-specific second eSIM profile that includes a second non-public network identifier for the second private network; and configuring the user equipment with the locale-specific second eSIM profile.

19. The non-transitory computer readable medium of claim 18, further comprising instructions to cause the processor to perform receiving a user equipment identifier from the user equipment, wherein the instructions to cause the processor to perform determining that the user equipment is authorized to access the second private network include instructions to cause the processor to perform:

sending, to an enterprise policy server, a request to authorize the user equipment for the second private network, the request including the user equipment identifier and the second non-public network identifier; and receiving, from the enterprise policy server, a response that indicates that the user equipment is authorized to access the second private network.

20. The non-transitory computer readable medium of claim 18, wherein:

the information includes a location of the user equipment and identifiers associated with neighbor networks discovered by the user equipment while in the second locale; and the instructions to cause the processor to perform identifying includes instructions to cause the processor to perform identifying the second private network using the location and the identifiers associated with the neighbor networks.

* * * * *